(12) United States Patent
Heinz

(10) Patent No.: US 6,298,231 B1
(45) Date of Patent: Oct. 2, 2001

(54) METHODS, SYSTEMS, AND DEVICES FOR TRANSMITTING MESSAGES TO WIRELESS DEVICES

(75) Inventor: John M. Heinz, Chapel Hill, NC (US)

(73) Assignee: Ready Com, Inc., Chapel Hill, NC (US)

( * ) Notice: Subject to any disclaimer, the term of this patent is extended or adjusted under 35 U.S.C. 154(b) by 0 days.

(21) Appl. No.: 09/163,072

(22) Filed: Sep. 29, 1998

(51) Int. Cl.⁷ .................................................. H04M 11/00
(52) U.S. Cl. .............................................. 455/413; 455/412
(58) Field of Search ........................................ 455/412, 413, 455/414, 415, 461, 466, 433; 379/88.11, 88.12, 88.1

(56) References Cited

U.S. PATENT DOCUMENTS

| | | |
|---|---|---|
| 4,597,104 | 6/1986 | Ohki et al. . |
| 4,803,679 | 2/1989 | Shimizu . |
| 5,177,780 | 1/1993 | Kasper et al. . |
| 5,193,209 | 3/1993 | Maeda et al. . |
| 5,289,526 | 2/1994 | Chymyck et al. . |
| 5,313,515 | 5/1994 | Allen et al. . |
| 5,329,578 | * 7/1994 | Brennan et al. ..................... 455/414 |
| 5,418,843 | 5/1995 | Stjernholm . |
| 5,546,444 | 8/1996 | Roach, Jr. et al. . |
| 5,577,103 | 11/1996 | Foti . |
| 5,594,949 | 1/1997 | Andersson et al. . |
| 5,610,972 | 3/1997 | Emery et al. . |
| 5,628,051 | 5/1997 | Salin . |
| 5,802,466 | * 9/1998 | Gallant et al. ....................... 455/413 |
| 5,907,805 | * 5/1999 | Chotai ................................. 455/414 |
| 5,987,317 | * 11/1999 | Venturini ............................. 455/413 |
| 6,014,559 | * 1/2000 | Amin ................................... 455/413 |

\* cited by examiner

Primary Examiner—Nay Maung
Assistant Examiner—Quochien B. Vuong
(74) Attorney, Agent, or Firm—James L. Ewing, IV; Geoff L. Sutcliffe; Kilpatrick Stockton LLP

(57) ABSTRACT

A communication network includes a messaging system connected to a mobile switching center in a cellular network. When calls to a wireless device go unanswered, the messaging system answers the calls and records a message for that device. The messaging system sets a message waiting indicator (MWI) flag in a home location register (HLR) associated with the wireless device. When the wireless device then establishes communications with the mobile switching center, the mobile switching center transmits a MWI signal to the wireless device. The wireless device, after receiving the MWI signal, automatically establishes communications with the messaging system in order to retrieve the messages. The messages are digitized and compressed and are transmitted to the wireless device over a voice channel with DTMF signaling. The wireless device mutes the handset of the wireless device so that communications with the messaging system go entirely unnoticed by the user.

32 Claims, 6 Drawing Sheets

METHODS, SYSTEMS, AND DEVICES FOR TRANSMITTING MESSAGES TO WIRELESS DEVICES

FIELD OF THE INVENTION

The present invention relates generally to methods, systems, and devices for transmitting messages to wireless devices and, more particularly, to methods, systems, and devices for using a message waiting indicator in transmitting voice messages to mobile radiotelephones or to pagers.

BACKGROUND OF THE INVENTION

An adage in the business world is that a lost call is a lost opportunity. Many businesses, if not most, therefore provide their employees with voice mail so that if they do miss a call, the calling party is able to leave a message which the called party can then return. While the need is perhaps greatest for a business, many individuals also do not want to miss any telephone calls and therefore rely on answering machines or answering services to allow the calling party to leave a message.

A typical voice mail system includes a voice mail server for storing the voice messages. When an incoming call is not answered at a particular telephone, the voice mail server answers the call and presents the calling party with a prerecorded greeting, usually in the voice of the called party. After the greeting has been played, the voice mail server prompts the calling party to leave a message and records any message left by the calling party. The voice mail server activates an indicator at the called telephone, such as by flashing a message light, to notify the called party that a message has been stored. The called party thereafter calls the voice mail server and enters his or her extension and password in order to retrieve the stored message. The voice mail server then plays the message for the called party. The voice mail server may be located at the premises of the called party or may be remotely located, such as at a Service Control Node (SCN) within the Public Switched Telephone Network (PSTN).

Voice mail is not limited to wireline telephones but is also a service available to mobile radiotelephones. As with wireline telephones, a call to a mobile radiotelephone is answered by a voice mail server after a predetermined number of rings. The voice mail server plays a greeting to the calling party, prompts the party to leave a message, and then stores the message on behalf of the called party. The called party can thereafter call into the voice mail server and retrieve the message.

Because mobile radiotelephone are wireless devices, voice mail for mobile radiotelephones presents some difficulties not associated with wireline telephones. One of these challenges is notifying the called party that a message has been stored on its behalf. An Electronics Industries Association/Telecommunications Industry Association (EIA/TIA) Interim Standard (IS) 41C and EIA/TIA IS-136 addresses this problem by enabling a Message Waiting Indicator (MWI). In operation, when a message is stored for a mobile radiotelephone, the voice mail server sets a flag in a Home Location Register (HLR) for the mobile radiotelephone. When communications are later established with the mobile radiotelephone, the HLR sets an MWI indicator on the handset to notify the user that a message has been received. The MWI indicator, for instance, may consist of a message icon on an LCD display. The user then initiates a call to the voice mail server to listen to the message.

An example of a voice mail server for mobile radiotelephones having message waiting indication is described in U.S. Pat. No. 5,313,515 to Allen et al. The system includes an exchange and a voice messaging center connected to the exchange. The exchange connects a caller to a desired telephone and, if the call is not answered, diverts the call to the voice messaging center for recording a message from the caller. After the message has been stored, the voice message center transmits a message waiting flag for that telephone to the exchange. The exchange, in turn, transmits a message waiting signal to the telephone when it registers with a cell of the network or if the telephone initiates an outgoing call. To retrieve the stored message, the user then calls into the voice message center. The user may manually initiate the call by dialing or pressing one or more keys or, alternatively, the handset may automatically initiate the call to the voice messaging center.

One limitation of conventional voice mail for mobile radiotelephones is that the user may be notified of a message but is temporarily unable to retrieve the message. The user, for instance, may have turned off the mobile radiotelephone when a calling party attempts to place a call to the mobile radiotelephone. In such circumstances, the voice mail server will answer the call and record a message for the user. If the user later turns on the mobile radiotelephone, the MWI flag will be set in the mobile radiotelephone by the mobile radiotelephone network. The user, however, may not notice that the MWI indicator has been set until the user leaves the operating range of the network. The user would therefore have to wait until service becomes available with the mobile radiotelephone or until the user can reach a wireline telephone. This delay may be unacceptable, especially if the call was urgent and the calling party needed a prompt response from the user. Other situations, such as low battery, also occur preventing the user from retrieving his or her messages from the voice mail server.

Another problem endemic to mobile radiotelephones is that the call to the voice mail server from the mobile radiotelephone can be costly. To retrieve a message, a user must acquire a voice channel and call into the voice mail server. Upon reaching the voice mail server, the user typically enters a password and possibly his or her mailbox number. The voice mail server then plays the stored messages to the user and the user is presented with options as to actions that may be taken on the stored messages. The user, for instance, may erase the message, save the message, or forward the message. A significant amount of time can be consumed while the user calls into the voice mail server, listens to the messages, and performs additional actions on the messages. Because the user is charged by a cellular service provider based on the amount of air time consumed, the voice mail service for a user can become expensive due to the air time used in retrieving and otherwise managing his or her voice messages.

SUMMARY OF THE INVENTION

The present invention solves the problems described above with systems, methods, and devices for delivering voice messages. A system according to a preferred embodiment of the invention includes a messaging system for answering calls intended for a wireless device and for storing messages for the wireless device. After storing a message, the messaging system sets a Message Waiting Indicator (MWI) flag in a Home Location Register (HLR) for the wireless device. When the wireless devices establishes communications with the messaging system, an MWI signal is sent to the wireless device. In response to the MWI signal, the wireless device, in contrast to a conventional wireless device, automatically establishes communications with the messaging system to retrieve the messages. The messaging system downloads the messages to the wireless device and the wireless device stores the messages in memory. After the messages have been received at the wireless device, the wireless device notifies the user that messages are stored on its behalf.

In a preferred embodiment, the messaging system and wireless device communicate with DTMF tones. The messages, for instance, are digitized and are compressed prior to transmitting them to the wireless device. By using DTMF signaling, the amount of air time consumed in transmitting the messages is significantly reduced in comparison to listening to the messages over a voice channel. Another advantage of the invention is that the messages are automatically downloaded to the wireless device and the user need not perform any action. Instead, the user is able to listen to the messages at the handset without needing to have an open voice channel between the wireless device and the messaging system.

Accordingly, it is an object of the present invention to provide systems, methods, and devices for automatically delivering voice messages to mobile radiotelephones.

It is an another object of the present invention to provide devices for automatically retrieving and storing messages from a server after receiving a message waiting indication.

It is yet an another object of the present invention to provide systems, methods, and devices for reducing air time in managing stored messages.

It is yet a further object of the present invention to provide systems, methods, and devices for reducing air time in retrieving messages.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings.

DETAILED DESCRIPTION

Figure 1:
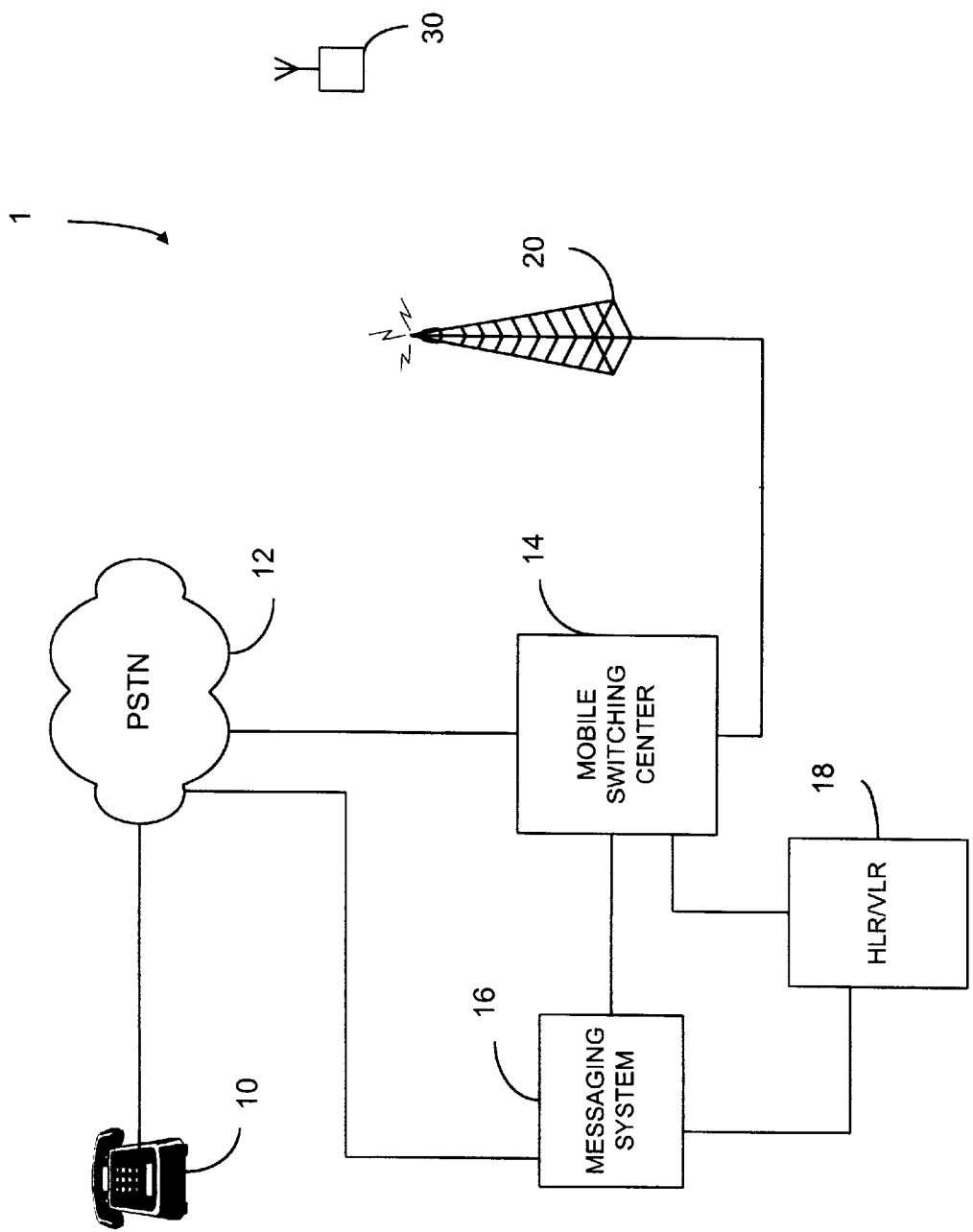
FIG. 1 is an overall diagram of a communication network according to a preferred embodiment of the invention.

Reference will now be made in detail to preferred embodiments of the invention, non-limiting examples of which are illustrated in the accompanying drawings. With reference to FIG. 1, a communication network 1 according to a preferred embodiment of the invention includes a messaging system 16 connected to a Mobile Switching Center 14 (MSC) and a wireless communication device 30. As is known in the art, the MSC 14 is connected to a tower 20 for communicating with wireless devices 30 and is connected to the Public Switched Telephone Network (PSTN) 12 for communicating with telephones, such as telephone 10, as well as other types of devices. The MSC 14 is also connected to, and communicates with, a Home Location Register (HLR) and a Visitor Location Register (VLR) 18. While only one telephone 10 has been shown, it should be understood that the MSC 14 communicates or carries signals from other types of telephones, such as wireless or portable telephones, as well as other types of devices, such as facsimile machines or computers.

As discussed above, one difficulty with conventional messaging with wireless devices is that a wireless device receives a Message Waiting Indicator (MWI) signal when it establishes communications with the cellular network. When the user is ready to receive the message or takes notice that the wireless device has received the MWI signal, the user may be unable to call into an associated message server to listen to the stored message. The network 1 shown in FIG. 1 addresses this problem by having the wireless device 30 automatically retrieve messages from a messaging system 16 after the wireless device 30 receives the MWI signal.

Figure 2:
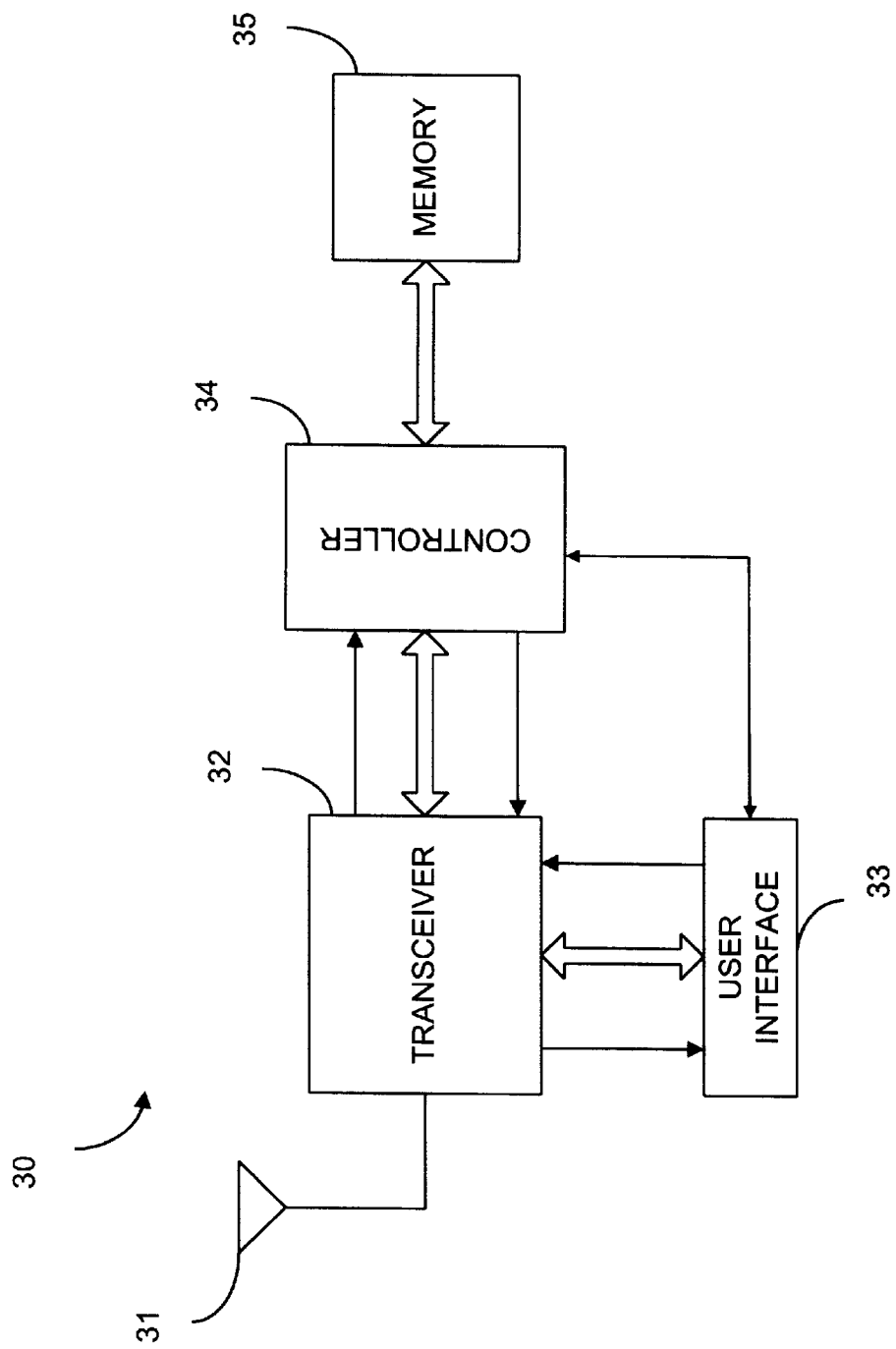
FIG. 2 is block diagram of a wireless device according to a preferred embodiment of the invention.

An example of the wireless device 30 is shown in FIG. 2. The wireless electronic device 30 according to a preferred embodiment of the invention comprises an antenna 31, a transceiver 32, a controller 34, a user interface 33, and memory 35.

The single antenna 31 is preferably used for both receiving and transmitting signals, although the wireless device 30 may comprise a separate antenna for transmitting signals and a separate antenna for receiving signals.

The transceiver 32 is connected to the antenna 31 and is for transmitting signals from the wireless device 30 and for receiving signals directed to the wireless device 30. The signals that may be transmitted to, or received from, the wireless device 30 include, but are not limited to, such signals as selective call signals, command data signals, signals corresponding to a message, and information data signals. The transceiver 32 preferably comprises a transceiver commonly used in a portable mobile radio telephone.

The transceiver 32 is connected to, and communicates with, the controller 34, which preferably comprises a microprocessor and a digital signal processor (DSP). The DSP is used to create, store, erase, and manipulate voice message while the microprocessor is used to control functionality of the wireless device 30.

The user interface 33, which contains all necessary input and output devices, is also connected to, and communicates with, the controller 34. The user interface 33 comprises a microphone, speaker, alerter, LED or LCD display, keypad, and necessary switches. The user interface 33 may also contain other types of input/output devices depending on the messaging application, such as a video display, camera, scanner, a printer, or a voice recognition device. The user interface 33 is not limited to these examples of user input/output devices but may comprise any input or output device which allows or assists communication between the user and the wireless device 30.

The memory 35 is connected to the controller 34 as well, and is for storing messages or other types of information transmitted to or generated at the wireless device 30. The memory 35 may comprise static RAM, Dynamic RAM, Flash RAM, EEPROM and/or any type of memory suitable for storing messages, for allowing the retrieval of the messages, or for storing program code. The invention is not limited to any particular size of memory 35 but rather the size of memory 35 may be varied to suit the needs of a specific application of the invention.

Figure 3:
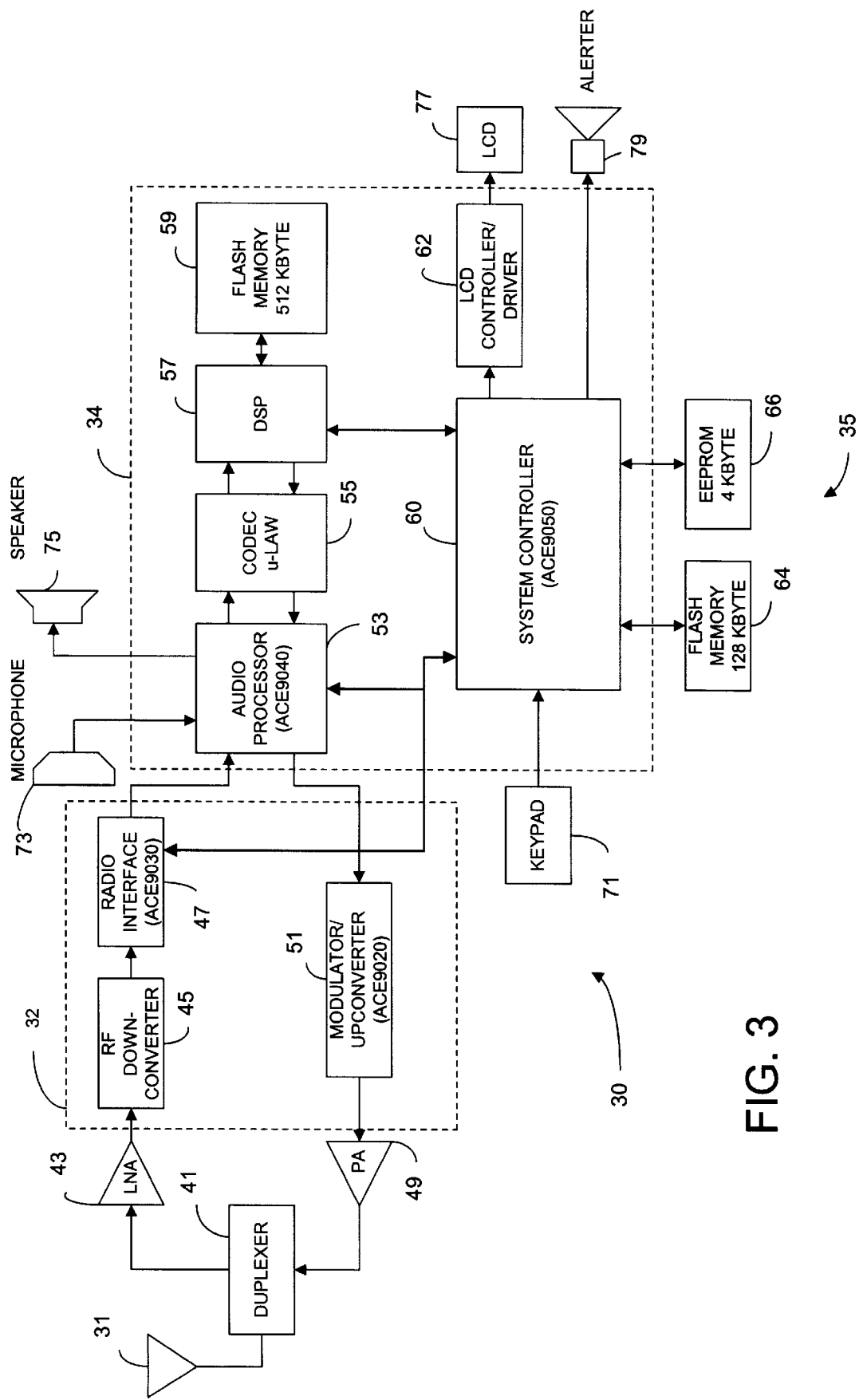
FIG. 3 is a more detailed diagram of the wireless device of FIG. 2.

The wireless device 30, as shown in more detail in FIG. 3, comprises the antenna 31 and an antenna interface 41 connected to the antenna 31. The antenna interface 41 directs signals received from antenna 31 to a receiver section of the wireless device 30 and directs signals transmitted from a transmit section to the antenna 31. The antenna interface 41 is preferably a duplexer, as shown in FIG. 3, however an antenna switch or other device may be utilized to provide signal isolation between the receiver section and transmitter section. Alternatively, if the wireless device 30 includes two antennas with one for transmitting signals and the other for receiving signals, the wireless device 30 would not require any type of antenna interface 41.

The receiver section includes a low-noise amplifier (LNA) 43 connected to the antenna 31 through the duplexer 41 for amplifying the signals received from the antenna 31. The LNA 43 then feeds the signal to a frequency downconverter 45, which converts it from RF frequency to an IF frequency suitable for demodulation in a manner well known to one skilled in the art. A radio interface 47 is connected to the downconverter 45 and selects the receive frequency based on an input from a system controller 60. The received signals are passed from the LNA 43, through the downconverter 45, and the radio interface 47, to an audio processor 53 for further processing.

The transmit section includes a power amplifier (PA) 49 connected to a modulator/upconverter 51. The modulator/upconverter 51 is for receiving outgoing signals from the audio processor 53. The audio processor 53 selects the transmit frequency based upon an input from the system controller 60. The outgoing signals are modulated and frequency-shifted to a higher frequency with the modulator/upconverter 51, amplified by the PA 49, supplied to the duplexer 41 and finally to the antenna 31 for transmission.

The controller 34 includes the audio processor 23 connected to the radio interface 47, the modulator/upconverter 51, and the system controller 60. The system controller 60 is preferably a microprocessor connected to Flash memory 64 and EEPROM memory 66. The system controller 60 also is connected to a digital signaling processor (DSP) 57, which in turn is connected to Flash memory 59. The system controller 60 is also connected to an LCD controller/driver 62 which controls operations of a liquid crystal display (LCD) 77.

The wireless device 30 includes various input/output devices forming the user interface 33. These devices include a keypad 71, a microphone 73, a speaker 75, the LCD 77, and alerter 79. As mentioned above, the user interface 33 may include additional devices and is not limited to the examples shown in this embodiment.

The DSP 57 includes necessary I-O and program memory, e.g., Flash memory 59, such as those commonly utilized in cellular telephones. Alternatively, the DSP 57 may be used in connection with, or substituted by, another type of electronic device, such as a coder/decoder (codec) 55, an digital-to-analog/analog-to-digital conversion circuit, or other type of modulator-demodulator including memory interface circuitry coupled to message memory 35 for reading and writing of messages.

In operation, when a calling party attempts to reach the wireless device 30, such as with telephone 10 through the PSTN 12 and MSC 14, the messaging system 16 answers the call after a predetermined number of rings. Reference is made to U.S. Pat. No. 5,003,576 to Helferich, which is incorporated herein, for additional details on how the messaging system 16 may store and forward messages to the wireless device 30. The calling party leaves a message which is stored in the messaging system 16. The messaging system 16, after receiving a message for one of its subscribers, sets an MWI flag in the HLR 18 of the MSC 14 for the wireless device 30. The messaging system 16 preferably sets this MWI flag in the HLR 18 through an SS7 link directly connecting the messaging system 16 to the HLR 18. Alternatively, the messaging system 16 may set the MWI flag in the HLR 18 by communicating through the MSC 14.

When the wireless device 30 later establishes communications with the MSC 14, the MSC 14 sends an MWI signal from the HLR 18 to the wireless device 30 through the tower 20. The wireless device 30 may establish communications with the MSC 14 for various reasons, such as in response to an autonomous registration, through roaming, in response to a feature request, or upon call origination. Upon receiving the MWI signal, the wireless device 30 activates an indicator, such as an icon on a display, informing the user that a message has been received and is stored within the device 30.

The wireless device 30, in contrast to conventional wireless devices, attempts to communicate with the messaging system 16 automatically after the receiving the MWI signal. After communications are established between the wireless device 30 and the messaging system 16, the messages stored in the messaging system 16 are downloaded to the wireless device 30. After all messages have been received at the wireless device 30, the wireless device 30 notifies the user that the messages have been received and are stored in the wireless device 30. The user is then able to listen and manage the messages at his or her convenience without requiring an active voice channel between the device 30 and the messaging system 16.

Figure 4:
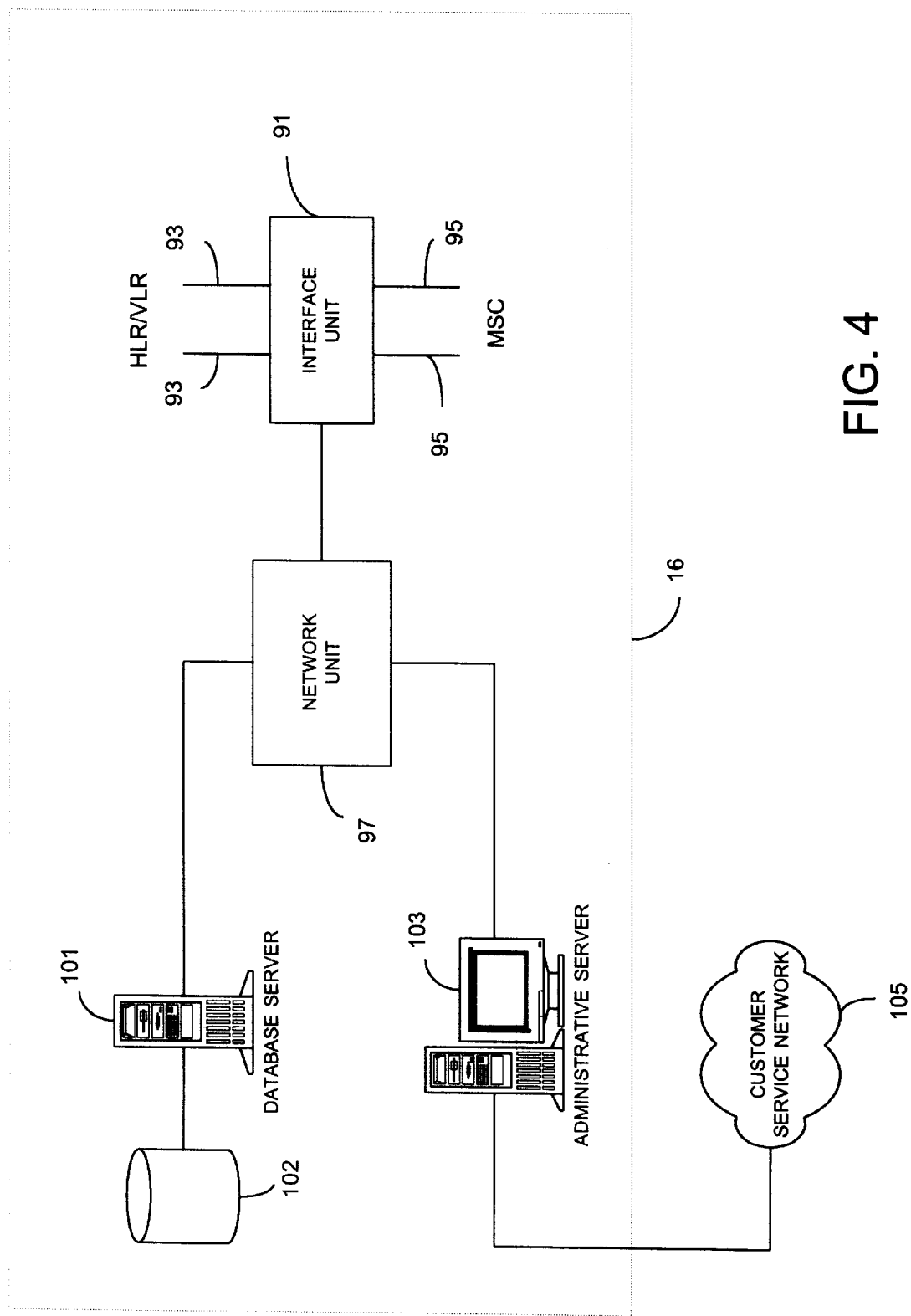
FIG. 4 is a block diagram of a messaging system according to a preferred embodiment of the invention.

A more detailed diagram of the messaging system 16 is shown in FIG. 4. The messaging system 16 includes an interface unit 91 having lines 93 connected to the HLR/VLR 18 and lines 95 connected to the MSC 14. In the preferred embodiment, the interface unit 91 comprises a Voice Recognition Unit (VRU), lines 93 comprise an SS7 A link, and lines 95 comprise two-way T1 voice trunks. The messaging system 16 also includes a network unit 97 which preferably comprises an Ethernet switch providing 100 Base T TCP/IP communication capabilities. A database server 101 having a database 102 is connected to the network unit 97. An administrative server 103 is also connected to the network unit 97 and has a link to a customer service network 105. The database server 101 performs management functions over messages stored in the database 102. The administrative server 103 is preferably connected to the customer service network 105 through an Ethernet connection, such as a 10 or 100 Base T line, and provides billing, supervisory, and other administrative support. In the preferred embodiment, each interface unit 91 can support up to four T1 lines and additional interface units 91 may be added to support additional subscribers.

Figure 5:
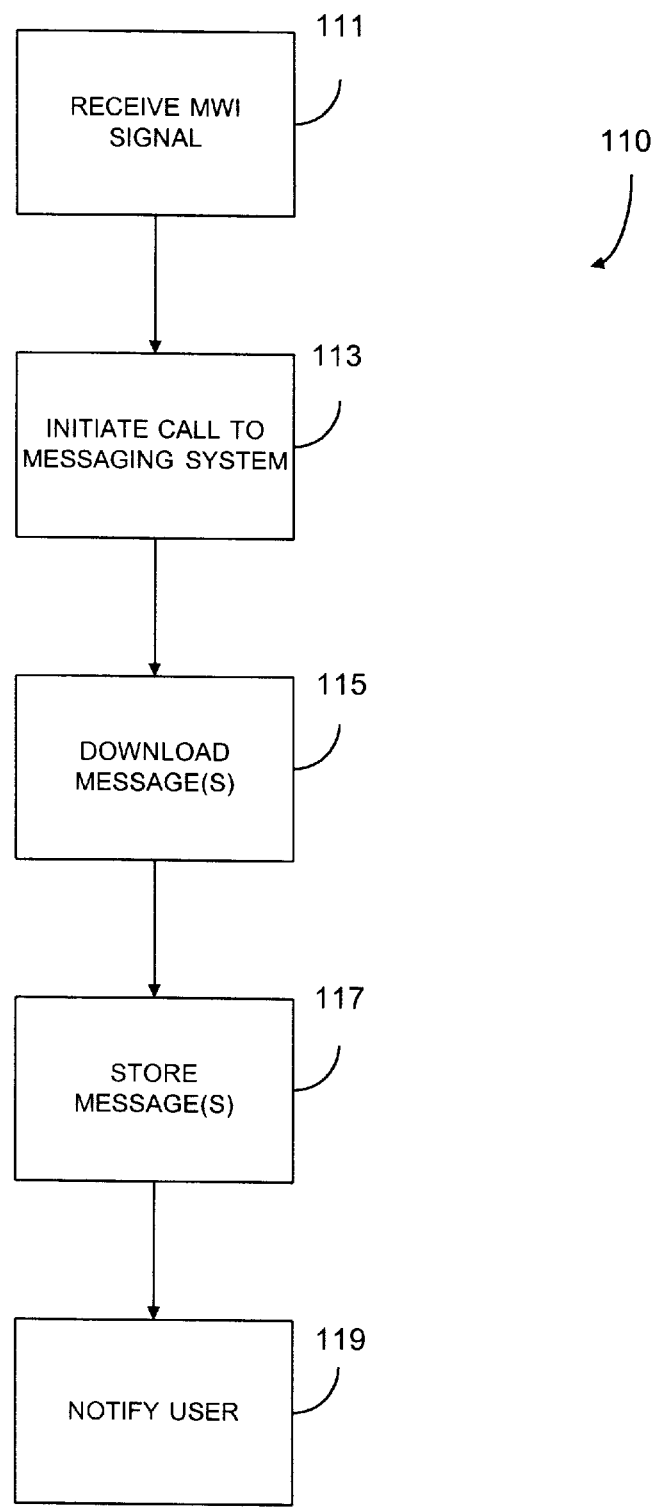
FIG. 5 is a flow chart of a process for receiving messages at the wireless device of FIG. 2.

A process 110 of downloading messages at the wireless device 30 will now be described with reference to FIG. 5. At step 111, the wireless device 30 receives the MWI signal. As discussed above, the MWI signal is sent from the MSC 14 when a message is stored at the messaging system 16. The MWI signal is passed through the antenna 31, down to the radio interface 47, and is then provided to the system controller 60. At step 113, the system controller 60 initiates a call to the messaging system 16. During this step 113, the system controller 60 preferably mutes the speaker 75 so that the DTMF signaling and other signaling between the wireless device 30 and the messaging system 16 go unnoticed by the user. When the call is answered at the messaging system 16, the system controller 60 performs a handshaking procedure to establish communications with the messaging system 16, at which time the system controller 60 identifies the wireless device 30 and performs any necessary authentication or authorization procedures. Next, at step 115, the messages stored at the messaging system are downloaded to the wireless device 30 and are stored in flash memory 59 at step 117. The system controller 60 preferably performs DTMF signaling with the messaging system 16 during the call/setup procedure and during the message download procedure. The messages, moreover, are preferably compressed by the messaging system 16 prior to being downloaded to the wireless device 30 and are decompressed by the codec 55 and DSP 57 at the wireless device 30. At step 119, the wireless device 30 notifies the user that the messages have been received and are stored in memory 59. The wireless device 30, for instance, may issue a distinct ring or a unique set of tones to inform the user that the download procedure has been completed. Alternatively, the wireless device 30 may provide a visual display on the LCD 77 or may issue a unique prompt on the speaker 75, such as voice prompt.

Figure 6:
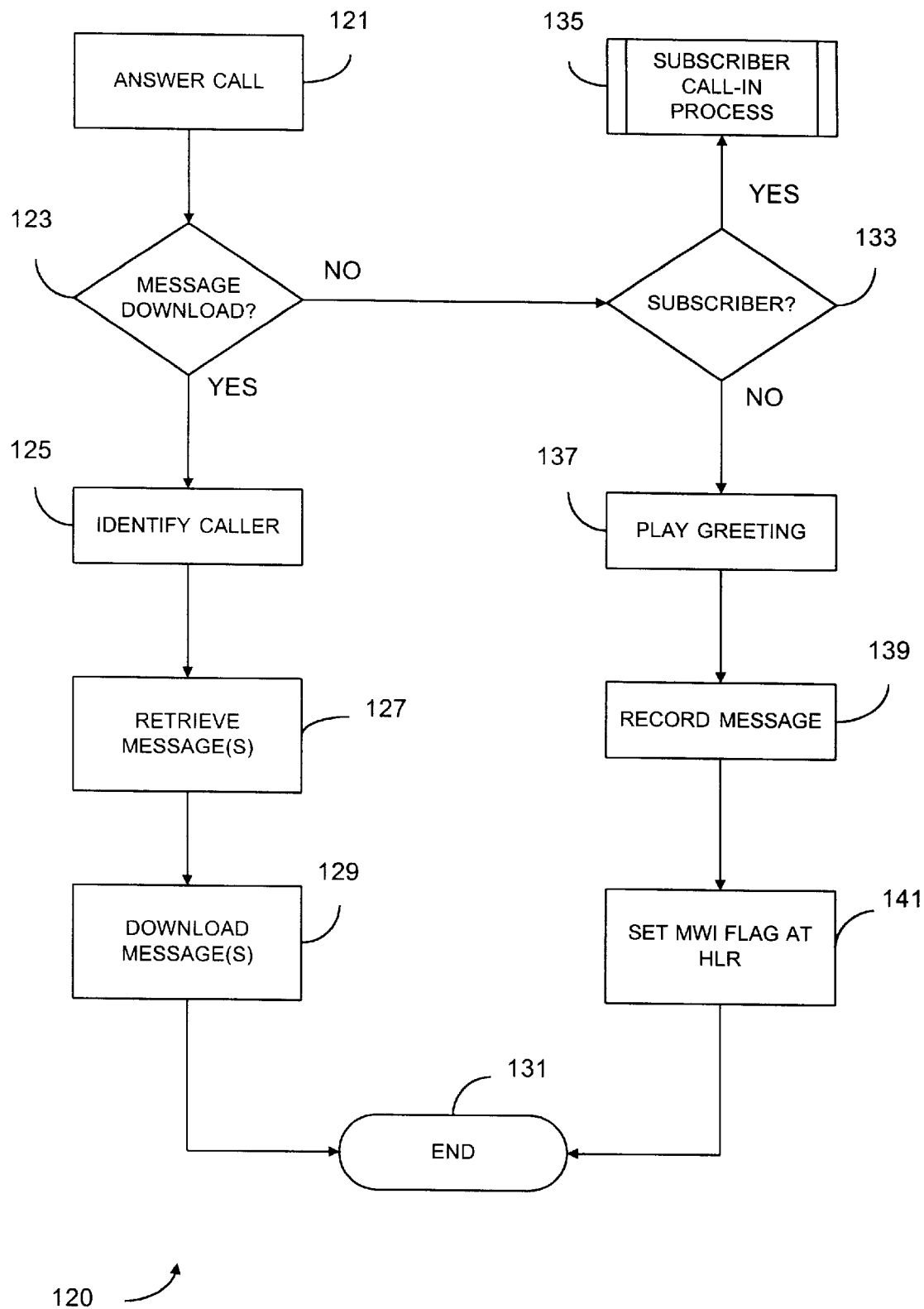
FIG. 6 is a flow chart of a method for processing incoming calls at the messaging system of FIG. 4.

A process 120 of receiving calls at the messaging system 16 will now be described with reference to FIG. 6. At step 121, a call is answered at the messaging system 16, with this call going through the MSC 14. At step 123, the messaging system 16 determines whether the call is for a message download to a wireless device. If the call received at the interface unit 91 is from the MSC 14, for instance, the messaging system 16 will then assume the call is a request for a message download and, at step 125, the interface unit 91 will identify the caller. The identity of the caller can be determined in various ways, and the interface unit 91 preferably uses Direct Inward Dialing (DID) to capture the Mobile Identification Number (MIN) of the wireless device 30. The database server 101 stores messages in separate directories for each wireless device 30 and, based on the MIN, will retrieve any stored messages from the database 102 and transfer these messages through the network unit 97 to the interface unit 91. At step 129, the messages stored on behalf of the wireless device 30 are downloaded to the wireless device 30 through the MSC 14 and tower 20.

The messaging system 16 needs to be able to distinguish between a party calling to leave a message for a subscriber, a subscriber calling to control his or her mailbox, and a wireless device 30 calling to download a message. This determination is made at step 123 and is accomplished by detecting out-of-band signaling generated by the wireless device 30. If the messaging system 16 does not detect this signaling, then at step 123 the messaging system 16 determines that the call is not for a message download and will next determine at step 133 whether the caller is a subscriber. If the caller is a subscriber, the messaging system 16 executes a subscriber call-in process at step 135. The messaging system 16 determines that the caller is a subscriber if the subscriber identifies itself by entering a certain code, which is received by the interface unit 91. This call-in process 135 allows subscribers to change their greeting, to check billing, to change a password, or to alter other aspects of the messaging service provided by the system 16.

As will be appreciated to those skilled in the art, the messaging system 16 can provide separate dial-in telephone numbers for subscribers, wireless devices 30 requesting the download of messages, and calling parties. The wireless devices 30, for instance, may use a separate telephone number of set of telephone numbers for calling into the messaging system 16 to retrieve the messages, in which case the messaging system 16 need not determine whether the calling party is attempting to leave a message or is a subscriber desiring to change his or her mailbox options. The messaging system 16 can then have a separate telephone number of set of telephone numbers dedicated to an interactive voice response (IVR) system for interacting with subscribers or callers wishing to leave a message.

When the caller is not a subscriber, as determined at step 133, the interface unit 91 then plays a prerecorded greeting at step 137 for the calling party. As is typical, the greeting identifies the called party and also prompts the calling party to leave a message. At step 139, the message left by the calling party is passed to the database server 101 and is stored in the database 102. The database server 101 preferably digitizes, compresses, and converts the message into a set of DTMF tones. At step 141, the interface unit 91 issues an MWI set signal to the HLR/VLR 18 over lines 93 in order to set the MWI flag for the wireless device 30. After the MWI flag is set, the processing of the incoming call at the messaging system 16 is completed at step 131.

The messages may be formatted into DTMF tones, or other signaling, in any suitable manner. In the preferred embodiment, the messages are digitized and then are formatted into 200 ms DTMF tones, with each DTMF tone providing 4 bits of data, or ½ byte of information. The signaling between the messaging system 16 and the wireless device 30 preferably incorporates verification procedures, such as a check-sum verification to ensure proper transmission of the data.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the invention has been described with reference to the Message Waiting Indicator (MWI) signal used in Personal Communication Services (PCS) described in EIA/TIA IS-136. While PCS is directed toward Time Division Multiple Access (TDMA) systems, the invention is not limited to TDMA systems or to devices complying with IS-136. Instead, the invention may be applied to other frequency reuse technologies, such as Code Division Multiple Access (CDMA) or Frequency Division Multiple Access (FDMA) systems. The invention, for instance, may be used with GSM systems and handsets or Specialized Mobile Radio (SMR) or Extended-SMR (E-SMR) systems and handsets.

The MWI signal accordingly is not limited to any specific format or network. The MWI signal, as defined in this application, refers to any message transmitted to a wireless device informing it of a message remotely stored on its behalf. The MWI signal, therefore, may be formatted as a Short Message Service (SMS) or may be transmitted in other ways over the control channels of a frequency reuse system.

Although the invention preferably downloads the messages via DTMF signaling, the messages may be downloaded to the wireless device in other ways. The messages, for instance, may be sent over the voice channel in analog format. Other ways of transmitting messages to the wireless device will become apparent to those skilled in the art.

The invention, moreover, is not limited to mobile radiotelephone networks but instead may use paging networks in addition to, or instead of, a mobile radiotelephone network. The MWI signal, for instance, may be transmitted to a wireless device over a paging network and the wireless device then initiates contact with a messaging system via the paging network or mobile radiotelephone network.

Although the invention has been described with reference to voice or other audio messages, it should be understood that the invention is also applicable to wireless devices that receive other types of messages. A wireless device, for instance, may receive a text message, email message, or data message and these messages may be automatically retrieved and stored in memory by the wireless device. The controller 60 can then convey the information in the message to the user through the LCD display 77.

The embodiments were chosen and described in order to explain the principles of the invention and their practical application so as to enable others skilled in the art to utilize the invention and various embodiments and with various modifications as are suited to the particular use contemplated.

What is claimed is:

1. A wireless device, comprising:
   a receiver for receiving a message waiting indicator signal, the message waiting indicator signal being generated when a message is remotely stored on behalf of the wireless device;
   memory for storing the message;
   a user interface for conveying user information in the message to a user; and
   a controller for automatically initiating communications with a message server in response to detecting the message waiting indicator signal, the controller for retrieving the message from the message server and for placing the message in memory.

2. The wireless device as set forth in claim 1, wherein the receiver is for receiving signals in a mobile radiotelephone network.

3. The wireless device as set forth in claim 1, wherein the receiver is for receiving signals in a paging network.

4. The wireless device as set forth in claim 1, wherein the controller is for initiating communications with the message server through a mobile radiotelephone network.

5. The wireless device as set forth in claim 1, wherein the controller is for initiating communications with the message server through a paging network.

6. The wireless device as set forth in claim 1, wherein the controller is for receiving a voice message and for storing the voice message in the memory.

7. The wireless device as set forth in claim 1, wherein the user interface includes a speaker and the controller mutes the speaker while the controller initiates communications with the message server.

8. The wireless device as set forth in claim 1, wherein the user interface includes a speaker for playing the message to the user.

9. The wireless device as set forth in claim 1, wherein the user interface includes a display for displaying the message to the user.

10. The wireless device as set forth in claim 1, wherein the controller supplies an alert signal to the user interface after the message has been retrieved from the message server.

11. The wireless device as set forth in claim 10, wherein the user interface generates an audible alert in response to the alert signal.

12. The wireless device as set forth in claim 1, wherein the user interface generates a visual alert in response to the alert signal.

13. The wireless device as set forth in claim 1, wherein the controller receives the message in digital format.

14. The wireless device as set forth in claim 1, wherein the controller receives the message as a set of DTMF tones.

15. The wireless device as set forth in claim 14, wherein the controller decompresses the DTMF tones into digital message data and stores the digital message data in the memory.

16. The wireless device as set forth in claim 1, wherein the controller receives the message in analog format.

17. A method for forwarding messages to a wireless device, comprising the steps of:
    receiving a message waiting indicator signal at the wireless device, the message waiting indicator signal being generated when a message is remotely stored on behalf of the wireless device;
    automatically initiating communications with a message server in response to receiving the message waiting indicator signal; and
    retrieving the message from the message server.

18. The method for forwarding messages as set forth in claim 17, wherein the step of receiving the message waiting indicator signal comprises a step of receiving the message waiting indicator signal over a mobile radiotelephone network.

19. The method for forwarding messages as set forth in claim 17, wherein the step of receiving the message waiting indicator signal comprises a step of receiving the message waiting indicator signal over a paging network.

20. The method for forwarding messages as set forth in claim 17, wherein the step of initiating communications comprises a step of initiating communications with the message server over a mobile radiotelephone network.

21. The method for forwarding messages as set forth in claim 17, wherein the step of initiating communications comprises a step of initiating communications with the message server over a paging network.

22. The method for forwarding messages as set forth in claim 17, wherein the step of retrieving the message comprises a step of retrieving the message in analog format.

23. The method for forwarding messages as set forth in claim 17, wherein the step of retrieving the message comprises a step of retrieving the message in digital format.

24. The method for forwarding messages as set forth in claim 17, wherein the step of retrieving the message comprises a step of receiving the message as a set of DTMF tones.

25. The method for forwarding messages as set forth claim 17, further comprising a step of decompressing the message.

26. The method for forwarding messages as set forth in claim 17, further comprising a step of notifying a user that the message has been received.

27. The method for forwarding messages as set forth in claim 17, further comprising a step of conveying information in the message to a user.

28. The method for forwarding messages as set forth in claim 27, wherein the step of conveying comprises a step of playing the message on a speaker.

29. The method for forwarding messages as set forth in claim 27, wherein the step of conveying comprises a step of displaying the message to the user.

30. The method for forwarding messages as set forth in claim 17, further comprising a step of muting a speaker during the step of initiating communications with the message server.

31. The method for forwarding messages as set forth in claim 17, further comprising a step of muting a speaker during the step of retrieving the message from the message server.

32. The method for forwarding messages as set forth in claim 17, further comprising a step of storing the message in memory at the wireless device.

* * * * *